United States Patent [19]

Emerson

[11] Patent Number: 5,074,263

[45] Date of Patent: Dec. 24, 1991

[54] STOP/START CONTROL SYSTEM FOR AN INTERNAL COMBUSTION ENGINE

[76] Inventor: Charles E. Emerson, 3523 W. Citrus Way, Phoenix, Ariz. 85019

[21] Appl. No.: 474,543

[22] Filed: Feb. 2, 1990

[51] Int. Cl.$^5$ ............................................. F02N 17/00
[52] U.S. Cl. .............................. 123/179.5; 123/179.17
[58] Field of Search ............ 123/179 BG, 424, 179 L, 123/187.5 R, 447, 179 R

[56] References Cited

U.S. PATENT DOCUMENTS

| | | | |
|---|---|---|---|
| Re. 31,218 | 4/1983 | Hicks et al. | 123/1 |
| 1,043,110 | 11/1912 | Kent | 123/179 BG |
| 1,676,591 | 7/1928 | Weller | 123/179 L |
| 3,310,937 | 3/1967 | Smith | 60/39.14 |
| 3,779,218 | 12/1973 | Nambu | 123/117 |
| 3,967,598 | 7/1976 | Rachel | 123/32 |
| 4,006,723 | 2/1977 | Schmidli | 123/179 |
| 4,122,355 | 10/1978 | Turbitt | 290/38 |
| 4,161,160 | 6/1979 | Hicks et al. | 123/1 |
| 4,202,309 | 5/1980 | Burke | 123/180 |
| 4,286,683 | 9/1981 | Zeigner et al. | 180/54 |
| 4,309,968 | 1/1982 | DuBois | 123/187.5 R |
| 4,346,683 | 8/1982 | Burke | 123/180 |
| 4,364,343 | 12/1982 | Malik | 123/179 |
| 4,373,479 | 2/1983 | Billingsley et al. | 123/187.5 R |
| 4,462,348 | 7/1984 | Giardini | 123/179 R |
| 4,554,896 | 11/1985 | Sougawa | 123/179 |
| 4,681,079 | 7/1987 | Kaneta | 123/491 |
| 4,770,142 | 9/1988 | Hayashi et al. | 123/424 |

FOREIGN PATENT DOCUMENTS

| | | | |
|---|---|---|---|
| 3117144 | 11/1982 | Fed. Rep. of Germany | 123/179 BG |
| 2569776 | 3/1986 | France | 123/179 R |
| 58-148223 | 9/1983 | Japan | 123/179 L |
| 59-224428 | 12/1984 | Japan | 123/447 |

Primary Examiner—Andrew M. Dolinar
Attorney, Agent, or Firm—Don J. Flickinger; Jordan M. Meschkow

[57] ABSTRACT

A system which includes spark control and fuel charge injection features is disclosed. The spark control feature includes an actuator coupled to distributor points and a switch which controls energization of a coil. A throttle operates the switch. When the throttle is in an idle position, the coil is de-energized, and the engine stops running. The engine is restarted by energizing the coil and causing the actuator to operate points so that spark is produced in a last-encountered cylinder. The last-encountered cylinder contains a fuel charge, and the spark ignites the fuel charge to turn the engine over, causing the engine to start. The fuel charge injection feature includes an accumulator which is fed from the same high pressure fuel lines which feed fuel injectors while the engine is running. A valve traps pressurized fuel within the accumulator while the engine is stopped. Immediately prior to starting the engine, the valve opens causing pressurized fuel to enter the high pressure fuel lines. The injectors inject this fuel into the engine's cylinders. The spark control feature may then be used to start the engine by igniting the fuel charge injected into the last-encountered cylinder.

20 Claims, 3 Drawing Sheets

5,074,263

STOP/START CONTROL SYSTEM FOR AN INTERNAL COMBUSTION ENGINE

TECHNICAL FIELD OF THE INVENTION

The present invention relates generally to the stopping and starting of internal combustion engines. More specifically, the present invention relates to the automatic stopping of an internal combustion engine upon the occurrence of a first predetermined event and to the automatic starting of an internal combustion engine, without the use of a starter motor, upon the occurrence of a second predetermined event.

BACKGROUND OF THE INVENTION

The motor vehicle industry has engaged in a continuous quest to improve fuel consumption and pollution emissions of internal combustion engines that power motor vehicles. One recognized scheme for simultaneously improving fuel consumption and emissions calls for automatically stopping the vehicle's engine when the vehicle is stopped, such as in heavy traffic, at a stop light, during a delivery or quick errand, and the like. When the driver is ready to proceed, the vehicle is restarted. Fuel consumption is reduced because the engine uses no fuel while it is stopped. Emissions are reduced because the engine produces no exhaust while it is stopped.

For a stop/start scheme to be successful, the driver should be required to perform no more than a small part of the scheme. Preferably, such a scheme should be transparent to the normal, conventional operation of a vehicle. Otherwise, complication for the driver increases, and the driver is encouraged to defeat the stop/start scheme. Thus, systems have been proposed to automatically stop then later automatically restart an engine.

Conventional systems have devised generally acceptable schemes for automatically stopping an engine. Typically, one or more sensors may detect whether the engine is idling, whether the vehicle is stopped, or whether the brake is depressed. Based on one or more of these conditions, the engine's ignition may be automatically de-energized or the engine's fuel flow may be automatically disabled to stop the engine. No action beyond the normal operation of the vehicle is required from the driver.

On the other hand, conventional systems have failed to provide an acceptable automatic starting function for a stop/start scheme. Specifically, such systems typically require operation of the vehicle's starter motor in order to restart the engine. The use of the starter motor is particularly undesirable in a stop/start scheme because a vehicle's engine is started many more times than occurs during normal conventional vehicle operation. Conventional vehicle starter motors are far too unreliable for this "heavy-duty" type service. Thus, such conventional starter motors are quickly worn out. While the starter motor and all gears used in starting an engine may be constructed in a more "heavy-duty" fashion, such heavy-duty construction increases vehicle weight and cost. In addition, the increased use of a starter motor places a greater demand on a vehicle's battery. As a result, a larger battery must be used in the vehicle, and this larger battery again increases vehicle weight and costs. The increases in weight harm fuel consumption, and increases in weight and cost together lessen incentives to implement a stop/start scheme to conserve fuel.

Furthermore, the use of a vehicle's starter motor to start an engine tends to make the starting function occur too slowly. For example, a stop/start scheme should monitor various sensors to detect the occurrence of a starting event. Some systems require the driver to actuate a specifically designated starting switch in order to start the engine. Other systems monitor other vehicle sensors, such as brake pedal, ignition switch, gas pedal position, and the like, to automatically actuate a starter motor. In either situation, at least a couple of seconds must transpire after the occurrence of a starting event before the vehicle may proceed. This duration is undesirably long because it forces drivers to operate their vehicles in an unconventional manner.

SUMMARY OF THE INVENTION

Accordingly, it is an advantage of the present invention that an improved stop/start control system for a vehicle's internal combustion engine is disclosed.

Another advantage of the present invention is that a stop/start control system which refrains from using a vehicle's starter motor is provided.

Yet another advantage is that the present invention utilizes selective spark control to start an engine.

Still another advantage is that the present invention provides a stop/start control system which may, in fuel injected engines, selectively cause a starting charge of fuel to enter a cylinder to improve starting performance.

The above and other advantages of the present invention are carried out in one form by an improved method of automatically starting an internal combustion engine. The method of the present invention operates on multi-cylinder engines in which an ignition timing control mechanism couples to pistons within the cylinders to define a firing order. Whenever the engine is stopped, the timing control mechanism identifies a next-to-ignite cylinder based on the firing order. The method first energizes ignition for the engine, then manipulates the ignition timing control mechanism to cause a spark in one of the cylinders. This manipulation is performed so that a first spark which occurs after the energization of ignition for the engine occurs in the cylinder which comes before the next-to-ignite cylinder in the firing order.

The above and other advantages of the present invention are carried out in another form by an improved method of automatically starting an internal combustion engine. The method of this form of the present invention operates on an engine having a high pressure fuel line coupled from a pump to an injector to supply pressurized fuel to an engine cylinder. In this method, while the engine is running, an accumulator collects fuel from the high pressure fuel line. While the engine is stopped, the accumulator retains the fuel collected therein. The fuel is retained in a pressurized state. Prior to starting the engine, fuel from the accumulator is supplied to the high pressure fuel line, and injected into the cylinder.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENTS

Figure 1:
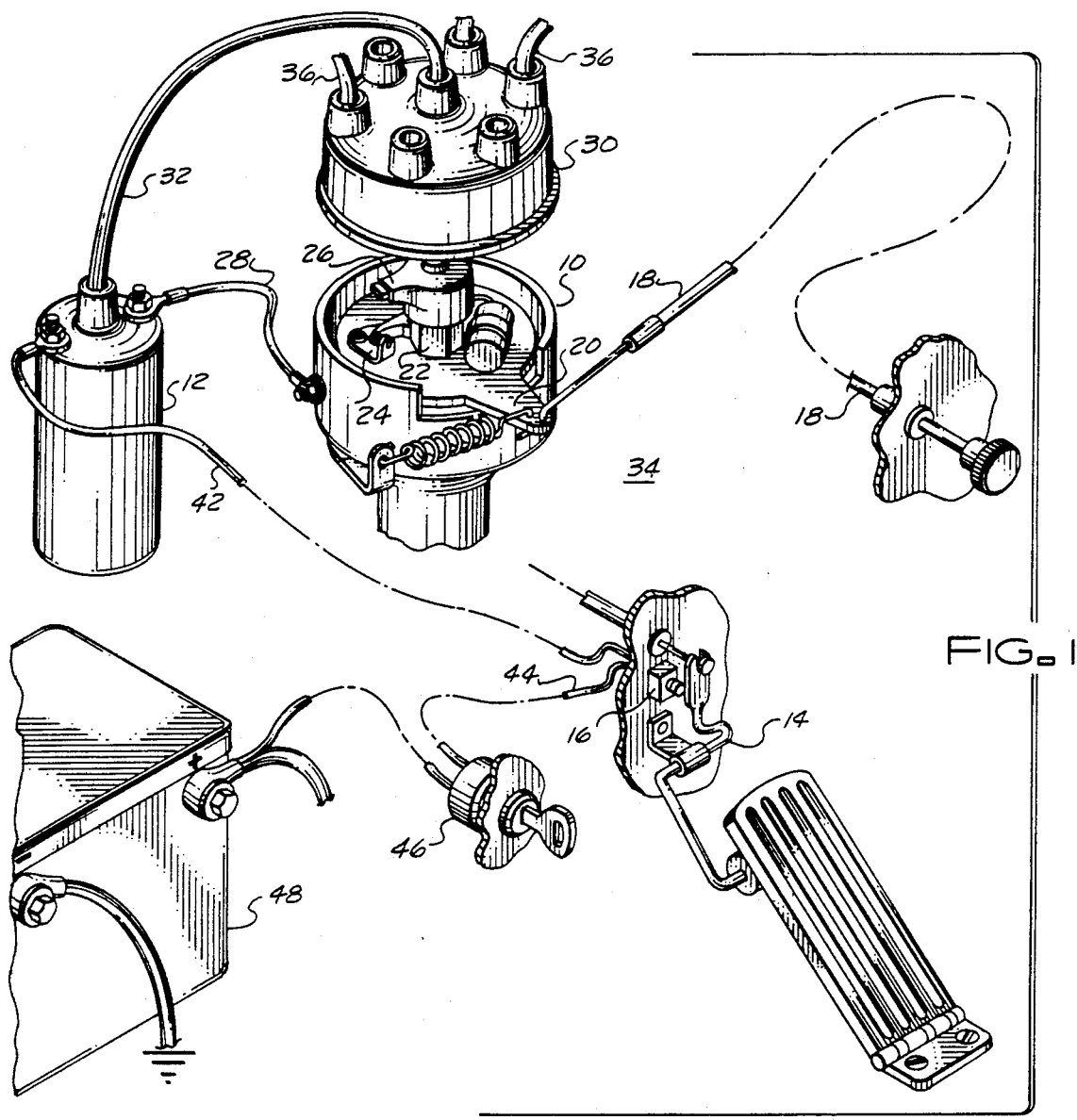
FIG. 1 shows a basic form of a spark control feature of the present invention.

FIGS. 1-4 illustrate a spark control feature of the present invention. In particular, FIG. 1 shows the cooperation between a distributor 10, an ignition coil 12, a throttle or gas pedal 14, a switch 16, and an actuator 18 in a basic form of the present invention. As is conventional in internal combustion engines, distributor 10 includes a spark advancement plate 20 rotatably mounted near a distributor cam 22. Ignition points 24 mount on plate 20 near cam 22, and a rotor cap 26 attaches on top of cam 22. Coil 12 electrically couples to points 24 in a conventional manner through a low voltage wire 28. In addition, coil 12 electrically couples to a distributor cap 30 portion of distributor 10 through a high voltage wire 32.

When an engine 34, of which distributor 10 is a part, runs, cam 22 and rotor 26 mounted thereon rotate. The rotation of cam 22 causes points 24 to open and close. This operation of points 24 causes coil 12 to generate a high voltage ignition electrical pulse. The rotation of rotor 26 distributes ignition pulse from high voltage wire 32 to one of spark plug wires 36 at a time. The selected one of spark plug wires 36 is determined by the relative positioning of rotor 26 with spark plug wires 36 in accordance with a firing order defined for engine 34.

Figure 2:
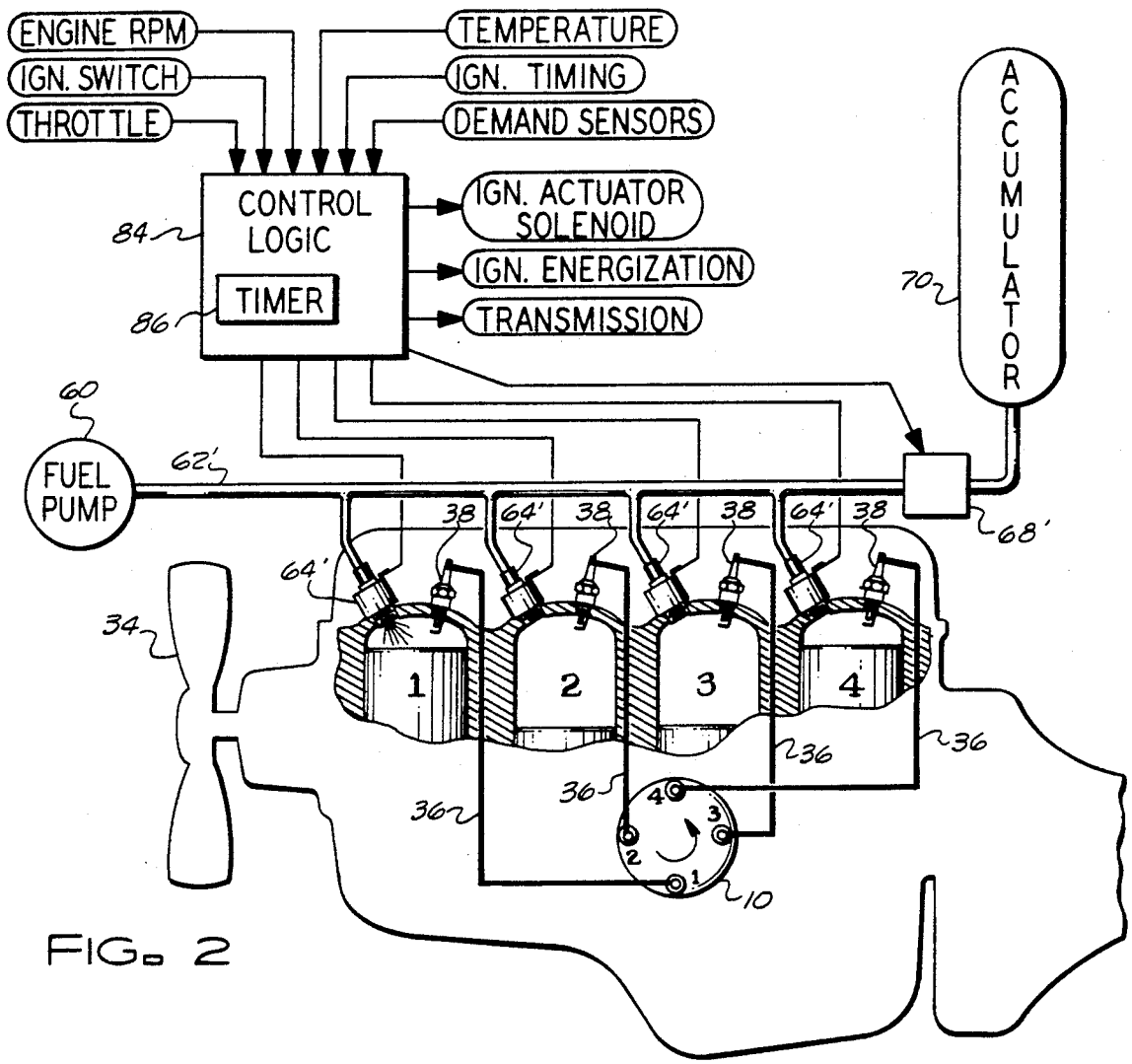
FIG. 2 shows a schematic view of the present invention applied to an engine having electronic fuel injection.

Referring to FIG. 2, the firing order specifies the order in which ignition spark is distributed through wires 36 to spark plugs 38 in cylinders 40. Specifically, each of cylinders 40 is associated with its own identifier, such as one of the numerals 1-4 for the four cylinder engine shown in FIG. 2. A firing order of 1-3-4-2 specifies that cylinder 3 fires after cylinder 1, cylinder 4 fires after cylinder 3, cylinder 2 fires after cylinder 4, cylinder 1 after cylinder 2, an so on. A conventional firing order for a six cylinder engine is 1-5-3-6-2-4, and a conventional firing order for an eight cylinder engine is 1-3-7-2-6-5-4-8. However, those skilled in the art will recognize that each engine will have its own firing order and need not adopt these firing orders.

With reference back to FIG. 1, actuator 18 physically couples to spark advancement plate 20 so that it controls ignition timing by positing plate 20 and points 24 relative to distributor cap 30 and spark plug wires 36.

Actuator 18 operates either independently or in concert with other mechanisms (not shown) for positioning spark advancement plate 20. Such other mechanisms may include conventional vacuum or centrifugal advance devices.

In this embodiment of the present invention, a wire 42 couples between a first port of switch 16 and an energization terminal of coil 12, and a wire 44 couples from a second port of switch 16 through a series-connected ignition switch 46 to a positive terminal of a battery 48. As is conventional, gas pedal 14 couples to a carburetor or fuel injection mechanism (not shown) to control fuel flow to cylinders 40 (see FIG. 2). Switch 16 physically resides near gas pedal 14 so that it becomes actuated or closed whenever gas pedal 14 is depressed. In other words, switch 16 is open only when gas pedal 14 is in its extreme-most idle position, in which it is not depressed any significant amount. Of course, gas pedal 14 and switch 16 may be configured so that a minor amount of pressing on gas pedal 14 causes engine 34 to remain idle while causing switch 16 to close. Thus, when gas pedal 14 is depressed to any position between the extreme-most idle position and a full open position, switch 16 is closed. Accordingly, assuming that engine 34 has been running, when gas pedal 14 goes to its extreme-most idle position, switch 16 opens and coil 12 becomes de-energized. As a result, no ignition spark is produced and engine 34 stops running.

Figures 3, 4:
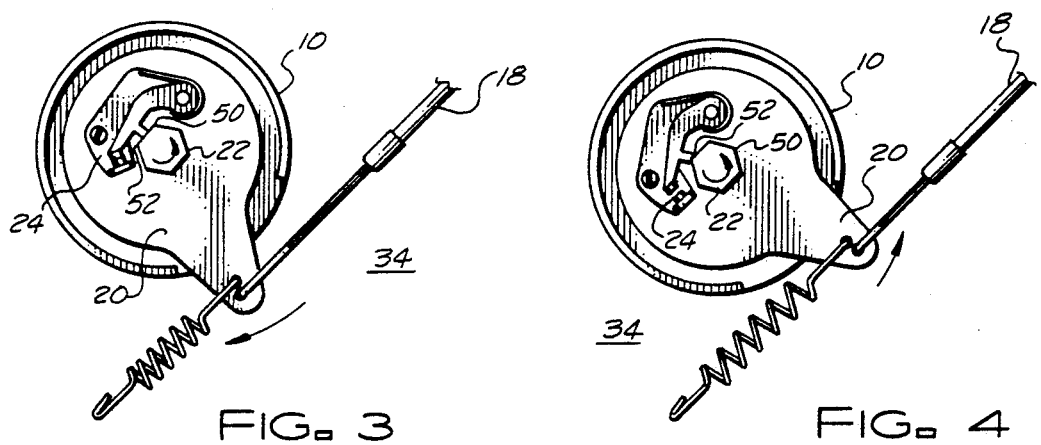
FIG. 3 shows a distributor having a spark advancement plate in an operational position.
FIG. 4 shows a distributor having a spark advancement plate in a start position.

After switch 16 initially opens, engine 34 continues to rotate for short period of time. This rotation causes distributor cam 22 to rotate. Eventually, engine 34 and cam 22 stop at a pseudo-random position. FIG. 3 illustrates the relative positions of cam 22 and points 24 when engine 34 is stopped. In the example shown in FIG. 3, cam 22 rotates in a counter-clockwise direction during the normal operation of engine 34. Thus, after engine 34 stops, the relative position of points 24 and cam 22 indicates a next-to-ignite ca lobe 50. Lobe 50 represents the next lobe on cam 22 which points 24 would normally encounter when engine 34 and cam 22 again rotate in their normal operating directions. Lobe 50 corresponds to a specific one of cylinders 40. Thus, lobe 50 also indicates a next-to-ignite one of cylinders 40.

When engine 34 stops, the particular one of cylinders 40 which becomes the next-to-ignite cylinder is generally random. Thus, any one of cylinders 40 may be the next-to-ignite cylinder. However, the precise position at which engine 34 stops relative to the next-to-ignite cylinder is not entirely random. In particular, when engine 34 is coasting to a stop, engine 34 encounters resistance where cylinders 40 go into their compression strokes. As a result, engine 34 tends to stop at a position where the next-to-ignite cylinder 40 has not yet reached top-dead-center on its compression stroke. Such a position is illustrated in FIG. 3 by points 24 encountering a flat portion of cam 22 when engine 34 stops.

The relative position of points 24 and cam 22 additionally identifies a last-encountered lobe 52. Last-encountered lobe 52 corresponds to the one of cylinders 40 which occurs immediately prior to the next-to-ignite cylinder in the firing order. In other words, the last-encountered cylinder was the last cylinder to experience a complete compression stroke while engine 34 coasted to a stop. In four cylinder, six cylinder, eight cylinder, and larger engines 34, the last-encountered cylinder remains under some degree of compression, even though it has passed its top-dead-center point.

Since ignition was removed while engine 34 was coasting to a stop, a fuel/air charge was supplied to this last-encountered cylinder and not ignited while engine 34 coasted to a stop. Those skilled in the art will recognize that this fuel/air charge is extremely explosive. Moreover, some degree of fuel tends to linger in containers, such as the last-encountered cylinder, for extended periods of time unless specific steps are taken to purge it. Thus, the fuel/air charge, or at least a usable portion of the charge, tends to remain under some degree of compression within the last-encountered cylinder for several minutes after engine 34 stops.

In order to restart engine 34, ignition for engine 34 is first energized. This energization occurs by depressing gas pedal 14 (see FIG. 1) so that switch 16 closes to complete a circuit from battery 48 to coil 12. FIG. 4 illustrates the relative positions of cam 22 and points 24 when engine 34 is restarted. In order to restart engine 34, actuator 18 is activated to move spark advancement plate 20 and points 24 relative to the now stationary cam 22. Actuator 18 moves plate 20 in the direction that cam 22 rotates. Movement in this direction has the effect of retarding ignition timing. Moreover, the distance which plate 20 moves is sufficient so that points 24 move at least to last-encountered lobe 52. For a four cylinder engine 34 the distance may be up to 90°, for a six cylinder engine it may be up to 60°, and for an eight cylinder engine it may be up to 45°.

As points 24 open when they come into contact with lobe 52, a high voltage pulse is produced by coil 12 (see FIG. 1) and routed through distributor cap 30 and a spark plug wire 36 to a spark plug 38 (see FIG. 2) in the last-encountered one of cylinders 40. The spark plug 38 produces a spark which ignites the fuel/air charge in the last-encountered cylinder. When ignited, the fuel/air charge produces a power stroke of sufficient strength to turn engine 34 over and begin running. After engine 34 has been turned over by igniting the fuel/air charge in the last-encountered cylinder, actuator 18 is operated to return spark advancement plate 20 to its original operating position, as shown in FIG. 3. Of course, additional spark advancement mechanisms (not shown) may then advance plate 20 in a manner well known in the art once engine 34 begins running.

While the above-described spark control feature of the present invention successfully stops and restarts engine 34, it may advantageously incorporate more sophisticated control logic than that described above. For example, actuator 18 may be operated automatically by using a vacuum-assisted or solenoid mechanism. In addition, the stopping and starting events may be determined by evaluating a variety of sensors rather than only a gas pedal position switch 16 (see FIG. 1). Such evaluations may be accomplished by coupling a control logic section in series with wire 42 between switch 16 and coil 12. Such added sophistication is discussed below.

Moreover, the above-discussed spark control feature of the present invention is not intended as an exclusive starting mechanism for engine 34. For example, when an engine is well worn, or when an engine is cold it may not start by utilizing the above-described spark control feature. In addition, when the engine 34 sits for extended periods, a large portion of the fuel/air charge in the last-encountered cylinder may bleed off, reducing the chances of starting engine 34 using the above-described spark control feature. Accordingly, in engines equipped with fuel injection, the present invention injects a fuel charge into the last-encountered cylinder, and perhaps others, to improve the starting performance of engine 34.

Figure 5:
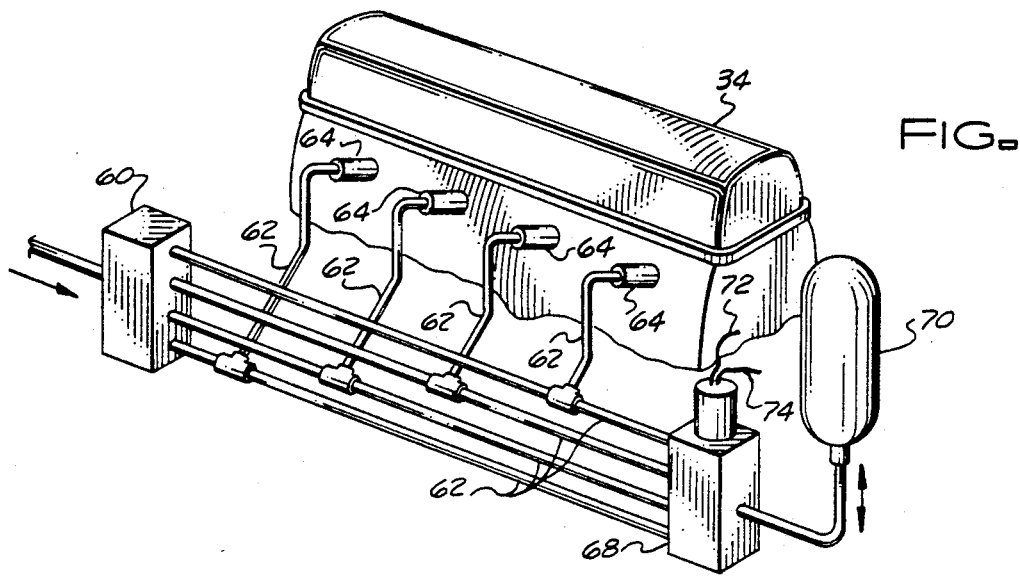
FIG. 5 shows a fuel charge injection portion of the present invention applied to an engine having pressure-pulse actuated fuel injection.

FIG. 2 illustrates the fuel-charge injection feature of the present invention in a schematic form for an engine 34 equipped with electronic fuel injection, and FIG. 5 illustrates the fuel-charge injection feature of the present invention in connection with an engine 34 equipped with pressure-pulse actuated fuel injectors. In the pressure-pulse actuated injector embodiment of FIG. 5, a pump 60 supplies and pressurizes individual high pressure fuel lines 62, in which each one of fuel lines 62 communicates fuel to its own injector 64. During the normal operation of engine 34, pump 60 couples to engine 34 to implement injection timing. Specifically, pump 60 follows the firing order in applying a fuel pressure pulse to each of fuel lines 62 so that injectors 64 activate and inject fuel into their respective cylinders 40 during their intake strokes.

In addition to coupling to an injector 64, each of fuel lines 62 couples to a first side of a valve assembly 68. A second side of valve assembly 68 couples to a reservoir or accumulator 70, and electrical control lines 72 and 74 couple to control inputs of valve assembly 68. Accumulator 70 is sealed and constructed so that it can withstand the pressures encountered by lines 62. The volume and location of accumulator 70 are not critical features in the present invention and can be selected by the designer to meet application requirements.

Figure 6:
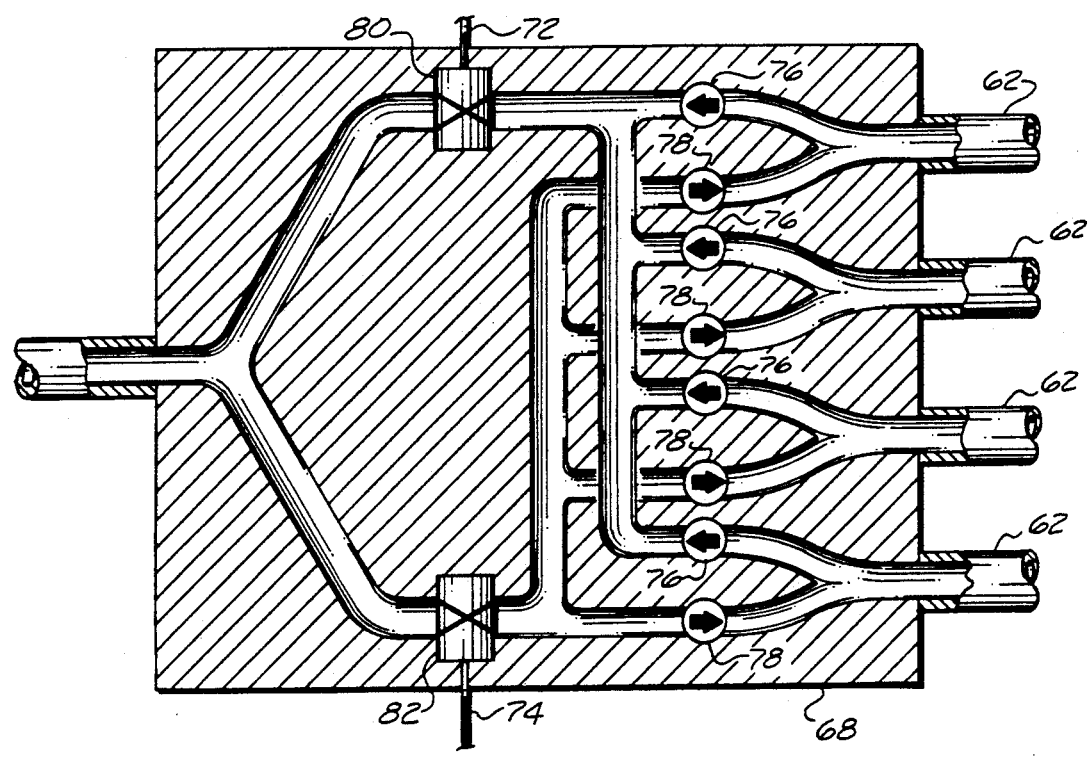
FIG. 6 shows a schematic view of a valve assembly shown in FIG. 5.

FIG. 6 shows a schematic view of an exemplary valve assembly 68. As shown in FIG. 6, the first side of valve assembly 68 includes inwardly directed one-way valves 76 and outwardly directed one-way valves 78 associated with each of lines 62. An incoming shut-off valve 80 is electrically controlled by control line 72 and is in fluid communication with all incoming one-way valves 76. An out-going shut-off valve 82 is electrically controlled by line 74 and is in fluid communication with all out-going one-way valves 78. Shut-off valves 80-82 couple to one another and to the second side of valve assemble 68. Valve assembly 68 maintains each of high pressure fuel lines 62 in isolation from one another while permitting fuel flow into accumulator 70. In particular, fuel flowing into valve assembly 68 from one of lines 62 does not influence the other ones of lines 62. However, fuel flowing out from assembly 68 is presented in generally equal proportions to each of lines 62.

With reference to the FIG. 2 embodiment of the present invention, a high pressure fuel pump 60' supplies fuel and pressurizes a high pressure fuel line 62', which in turn feeds fuel to electronic injectors 64'. Each of cylinders 40 has its own injector 64'. A control logic section 84, which is typically implemented using one or more microprocessor and driver circuits, electrically couples to each of injectors 64'. Section 84 follows the firing order in activating each of injectors 64' in synchronism with the operation of engine 34. In particular, control logic section 84 implements injection timing so that each of injectors 64' inject fuel into cylinders 40 during the cylinder's intake stroke. In addition, fuel line 62' couples to a first side of an electrically controlled shut-off valve 68'. A second side of valve 68' couples to accumulator 70, and a control input of valve 68' couples to control logic section 84.

Control logic section 84 includes a timer section 86 and senses a number of parameters in order to establish injection timing for injectors 64' and to control the spark control feature, discussed above. Specifically, control logic section 84 senses the ignition state for engine 34, the engine RPM, temperature, throttle position, ignition timing from distributor 10 (see FIG. 1), and other fuel demand sensors, such as manifold vacuum. Control lines output from control logic section 84 couple to a solenoid which serves as actuator 18, to the ignition energization terminal of coil 12, and to a transmission. Hence, the control logic associated with the above-discussed spark control feature may be implemented within control logic section 84 with more sophistication than was mentioned above. For example, control logic section 84 may advantageously be configured to de-energize ignition when gas pedal 14 (see FIG. 1) is in its idle position, temperature is above a first predetermined threshold, engine RPM is less than a second predetermined threshold, and/or a predetermined period of time has elapsed after engine 34 has started. The control signal output to the transmission commands operation of a clutch, gear selector, or other mechanism to permit engine starting without requiring the driver to take a transmission out of gear.

Figure 7:
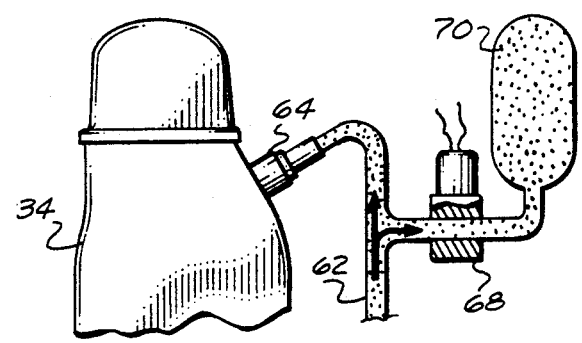
FIG. 7 shows operation of a fuel charge injection feature of the present invention while an engine is running.

FIG. 7 shows the operation of the fuel charge injection feature of the present invention while engine 34 is running for each of the FIG. 2 and FIG. 5 embodiments. While engine 34 is running, the control input of valves 68 and 68' (see FIGS. 2 and 5), hereinafter simply valve 68, is manipulated so that fuel is supplied to accumulator 70 along with being supplied to injectors 64 and 64' (hereinafter simply injectors 64). In the FIG. 5 embodiment, the control input may be manipulated by a control logic section similar to that shown in FIG. 2. Since fuel lines 62 or 62', hereinafter simply lines 62, are pressurized, fuel at that same pressure is eventually retained within accumulator 70.

Figure 8:
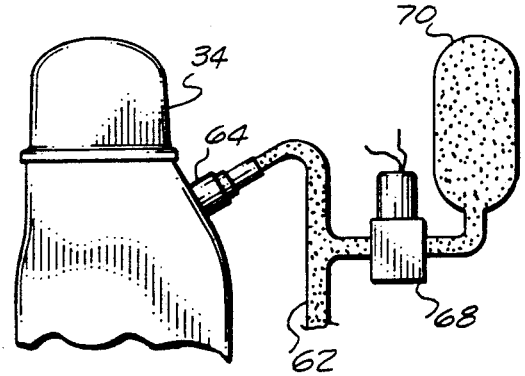
FIG. 8 shows operation of the fuel charge injection feature of the present invention while an engine is stopped.

Prior to de-energizing engine ignition, as discussed above in connection with the spark control feature of the present invention, or when ignition switch 46 is turned off, section 84 shuts off valve 68 so that fuel retained within accumulator 70 becomes entrapped therein at its then-existing pressure. This state, which is illustrated by FIG. 8, is maintained until immediately prior to restarting engine 34. The period of time may be a few seconds or long enough for engine 34 to completely cool down. Although the pressure maintained within lines 62 may bleed-down through pump 60 or 60' during this time, pressure is maintained within accumulator 70.

Figure 9:
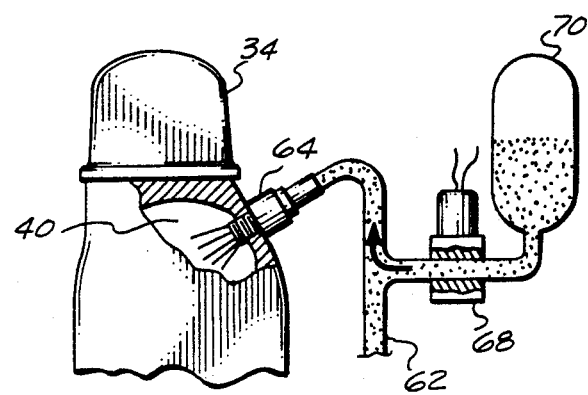
FIG. 9 shows operation of the fuel charge injection feature of the present invention immediately prior to starting an engine.

FIG. 9 illustrates the operation of this fuel charge injection feature immediately prior to starting engine 34. As shown in FIG. 9, control logic section 84 (see FIG. 2) controls valve 68 so that pressurized fuel may flow from accumulator 70 into fuel lines 62. With the pressure-pulse actuated injectors of FIG. 5, the receipt of this fuel pressure pulse causes all of injectors 64 to operate. As a result, a fuel charge is injected into each of cylinders 40. After a predetermined period of time, valve 68 is again controlled to remove the pressure pulse so that injectors 64 will reset. One of cylinders 40 will be the last-encountered cylinder, discussed above, and engine 34 may thereafter be started using the above-discussed spark control feature.

With the electronic fuel injection embodiment of FIG. 2, control logic section 84 may maintain sufficient ignition timing information to determine the last-encountered cylinder, and cause the corresponding one of injectors 64' to inject a fuel charge into that cylinder. However, section 84 may alternatively cause all of injectors 64' to inject fuel charges into each of cylinders 40 to insure that the last-encountered cylinder receives a fuel charge. With either technique, engine 34 may then be started using the above-discussed spark control feature.

In order to conserve fuel, control logic section 84 in the preferred embodiment of the present invention does not engage the fuel charge injection feature prior to each starting of engine 34. Rather, section 84 enables the fuel charge injection feature only when circumstances warrant its enablement. For example, this feature may be enabled only when engine temperature is below a predetermined threshold or when an unsuccessful attempt to start engine 34 has been made without using the fuel charge injection feature.

In summary, the present invention provides an improved stop/start control system for a vehicle's internal combustion engine. In particular, the system of the present invention provides for starting an engine through the control of engine spark rather than through the use of a starter motor. Moreover, in fuel injection engines, the present invention includes a feature to selectively inject a fuel charge into an engine to improve starting performance. The present invention allows for little or no driver effort in implementing a stop/start scheme and for rapid starting of an engine. In addition, it avoids the need of weighty and costly starter motor and battery components.

The present invention has been described above with reference to preferred embodiments. However, those skilled in the art will recognize that changes and modifications may be made in these preferred embodiments without departing from the scope of the present invention. For example, the present invention may be incorporated with a system which uses a starter motor for automatically starting an engine as a backup to the present invention. In addition, those skilled in the art can adapt the spark control features taught by the present invention into a computerized electronic spark control (ESC) or other electronic ignition timing systems. These and other changes and modifications which are obvious to those skilled in the art are intended to be included within the scope of the present invention.

What is claimed is:

1. A method or automatically starting an internal combustion engine having a plurality of cylinders and an ignition timing control mechanism wherein ignition points are mounted upon a spark advancement plate proximate a distributor cam so that during operation of said engine said distributor cam rotates in a first direction to operate said points, said timing control mechanism being coupled to said cylinders to define a firing order, said engine being stopped at a position in said firing order in which said timing control mechanism identifies a last-encountered cylinder, and said method comprises the steps of:

energizing ignition for said engine; and
   rotating said spark advancement plate in said first direction to cause said points to move relative to said cam to cause a first spark after said energizing step to occur, said first spark occurring in said last-encountered cylinder.

2. A method as claimed in claim 1 wherein a throttle, which is increasingly adjustable from an idle position, couples to said engine to control fuel flow to said cylinders, and said method additionally comprises the steps of:

sensing position of said throttle; and performing said energizing step when said throttle is not in said idle position.

3. A method as claimed in claim 1 wherein:
said rotating step moves said spark advancement plate away from an operating position; and
said method additionally comprises the step of returning said spark advancement plate to said operating position after said rotating step.

4. A method as claimed in claim 1 wherein said engine includes a predetermined number of cylinders and said rotating step includes the step of limiting rotation of said spark advancement plate to being within an arc which is less than 360 divided by said predetermined number of cylinders.

5. An apparatus for starting an internal combustion engine having a plurality of cylinders and having ignition points mounted upon a spark advancement plate proximate a distributor cam so that during operation of said engine said distributor cam rotates in a first direction to operate said points, said points being coupled to said cylinders to define a firing order, said engine being stopped at a position in said firing order in which said timing control mechanism identifies a next-to-ignite cylinder, and said apparatus comprising:
means for controlling ignition energization for said engine; and
an actuator coupled to said controlling means and mounted to selectively rotate said spark advancement plate in said first direction to cause said points to move relative to said cam and to cause a first spark after energizing ignition to occur in the one of said plurality of cylinders which comes before said next-to-ignite cylinder in said firing order.

6. An engine starting apparatus as claimed in claim 5 wherein:
a throttle, which is increasingly adjustable from an idle position, couples to said engine to control fuel flow to said cylinders;
said apparatus additionally comprises switch means, coupled to said throttle, for sensing position of said throttle; and
said controlling means comprises electrical circuit means coupled to said switch means and to said ignition points, said circuit means being configured to energize said ignition points when said throttle is not in said idle position.

7. An engine starting apparatus as claimed in claim 5 wherein:
said engine includes a predetermined number of cylinders; and
said actuator and said spark advancement plate are cooperatively configured to permit rotation of said spark advancement plate within an arc which is less than 360 divided by said predetermined number of cylinders.

8. A method for starting an internal combustion engine having a plurality of injectors, a corresponding plurality of cylinders, and an ignition timing control mechanism coupled to said plurality of cylinders to define a firing order, said engine stopping at a position in said firing order in which said ignition timing control mechanism identifies a last-encountered cylinder, and said method additionally having a high pressure fuel line coupled from a pump to an injector to supply pressurized fuel to said cylinders, said method comprising:
collecting fuel from said high pressure fuel line in an accumulator while said engine is running;
retaining said collected fuel in said accumulator while said engine is stopped, said retaining step maintaining said pressurized state of said fuel;
supplying pressurized fuel from said accumulator to said high pressure fuel line prior to starting said engine;
injecting fuel into said last-encountered cylinder prior to starting said engine;
energizing ignition for said engine; and
manipulating said ignition timing control mechanism to cause a first spark after said energizing step to occur, said first spark occurring in said last-encountered cylinder.

9. A method as claimed in claim 8 additionally comprising the step of ending said supplying step after a predetermined duration.

10. A method as claimed in claim 8 wherein said manipulating step occurs after said supplying step.

11. A method as claimed in claim 8 wherein a throttle, which is increasingly adjustable from an idle position, couples to said engine to control fuel flow to said cylinders, and said method additionally comprises the steps of:
sensing position of said throttle; and
performing said energizing step when said throttle is not in said idle position.

12. A method as claimed in claim 8 wherein:
ignition points mount upon a spark advancement plate proximate a distributor cam within said engine so that during operation of said engine said distributor cam rotates in a first direction to operate said points; and
said manipulating step comprises the step of rotating said spark advancement plate in said first direction to cause said points to move relative to said cam to start said engine.

13. An apparatus for starting an internal combustion engine in which a high pressure fuel line couples from a pump to a plurality of injectors to supply pressurized fuel to a corresponding plurality of cylinders, and in which an ignition timing control mechanism is coupled to said plurality of cylinders to define a firing order, said engine stopping at a position in said firing order where said timing control mechanism identifies a next-to-ignite cylinder, said apparatus comprising:
means for controlling ignition energization for said engine;
means, coupled to said ignition controlling means, for manipulating said ignition timing control mechanism to cause a first spark to occur in the one of said plurality of cylinders which comes before said next-to-ignite cylinder in said firing order;
valve means, having first and second ports and having a control input, for selective fluid transmission between said first and second ports, said first valve means port being i fluid communication with said high pressure fuel line and with each of said injectors;
a reservoir having an opening in fluid communication with said second valve means port, said reservoir being configured to hold said fuel at a pressure substantially equivalent to the pressure of said pressurized fuel; and
control means coupled to said engine and to said control input of said valve means, said control means being configured to operate said valve means to permit fuel flow from said first port to said second port when said engine is running and to prohibit fuel flow between said first and second ports when said engine is stopped.

14. An engine starting apparatus as claimed in claim 13 wherein:
   a throttle, which is increasingly adjustable from an idle position, couples to said engine to control fuel flow to said cylinders;
   said apparatus additionally comprises switch means, coupled to said throttle, for sensing position of said throttle; and
   said ignition controlling means comprises electrical circuit means coupled to said switch means and to said ignition timing, said circuit means being configured to energize said ignition for said engine when said throttle is not in said idle position.

15. An engine starting apparatus as claimed in claim 13 wherein:
   ignition points mount upon a spark advancement plate proximate a distributor cam within said engine so that during operation of said engine said distributor cam rotates in a first direction to operate said points; and
   said manipulating means comprises an actuator mounted to selectively rotate said spark advancement plate in said first direction to cause said points to move relative to said cam to start said engine.

16. An engine starting apparatus as claimed in claim 13 wherein said control means is further configured to operate said valve means to permit fuel flow from said second port to said first port prior to starting said engine.

17. An engine starting apparatus as claimed in claim 16 wherein:
   said control means is configured to operate said valve means to permit fuel flow from said second port to said first port at a first point in time; and
   said control means is further configured to operate said valve means to stop said fuel flow from said second port to said first port a predetermined duration after said first point in time.

18. A method for automatically starting an internal combustion engine having a plurality of cylinders and an ignition timing control mechanism coupled together to define a firing order, said timing control mechanism having ignition points mounted upon a spark advancement plate proximate a distributor cam so that during operation of said engine said distributor cam rotates in a first direction to operate said points, and having a throttle which is increasingly adjustable from an idle position and which controls fuel flow to said cylinders, said engine being stopped at a position in said firing order in which said timing control mechanism identifies a last-encountered cylinder, and said method comprising the steps of:
   sensing position of said throttle;
   energizing ignition for said engine in response to movement of said throttle away from said idle position; and
   rotating said spark advancement plate in said first direction to cause said points to move relative to said cam and to cause a first spark after said energizing step to occur, said first spark occurring in said last-encountered cylinder.

19. A method as claimed in claim 18 wherein:
   said rotating step moves said spark advancement plate away from an operating position; and
   said method additionally comprises the step of returning said spark advancement plate to said operating position after said rotating step.

20. A method as claimed in claim 18 wherein said engine includes a predetermined number of cylinders and said rotating step includes the step of limiting rotation of said spark advancement plate to being within an arc which is less than 360° divided by said predetermined number of cylinders.

* * * * *